US006973632B1

(12) United States Patent
Brahme et al.

(10) Patent No.: US 6,973,632 B1
(45) Date of Patent: Dec. 6, 2005

(54) METHOD AND APPARATUS TO ESTIMATE DELAY FOR LOGIC CIRCUIT OPTIMIZATION

(75) Inventors: Dhananjay S. Brahme, Fremont, CA (US); Jovanka Ciric, San Jose, CA (US); Kenneth S. McElvain, Sunnyvale, CA (US)

(73) Assignee: Synplicity, Inc., Sunnyvale, CA (US)

( * ) Notice: Subject to any disclaimer, the term of this patent is extended or adjusted under 35 U.S.C. 154(b) by 255 days.

(21) Appl. No.: 10/310,423

(22) Filed: Dec. 4, 2002

Related U.S. Application Data

(60) Provisional application No. 60/388,010, filed on Jun. 11, 2002.

(51) Int. Cl.[7] .............................................. G06F 17/50
(52) U.S. Cl. .............................. 716/6; 716/13; 716/14; 716/9; 716/10
(58) Field of Search .................. 716/6, 13, 14, 716/9, 10

(56) References Cited

U.S. PATENT DOCUMENTS

| | | | | |
|---|---|---|---|---|
| 5,452,239 | A | * | 9/1995 | Dai et al. ...................... 703/19 |
| 5,586,046 | A | * | 12/1996 | Feldbaumer et al. .......... 716/18 |
| 5,629,860 | A | * | 5/1997 | Jones et al. ..................... 716/6 |
| 5,754,826 | A | * | 5/1998 | Gamal et al. .................. 703/14 |
| 6,182,268 | B1 | | 1/2001 | McElvain |
| 6,189,131 | B1 | * | 2/2001 | Graef et al. .................... 716/8 |
| 6,389,586 | B1 | | 5/2002 | McElvain |
| 6,415,426 | B1 | * | 7/2002 | Chang et al. ................... 716/9 |
| 6,625,787 | B1 | * | 9/2003 | Baxter et al. ................... 716/6 |
| 6,872,601 | B1 | * | 3/2005 | Baxter et al. ............... 438/129 |
| 2003/0041309 | A1 | * | 2/2003 | Chopra et al. ................ 716/12 |
| 2004/0205683 | A1 | * | 10/2004 | Kovacs-Birkas et al. ...... 716/6 |

OTHER PUBLICATIONS

Sze et al., "Optimal circuit clustering with variable interconnect delay", IEEE Internaltional Symposium on Circuits and Systems vol. 4, May 26, 2002, pp. IV-707-IV-710.*

Changfan et al., "Timing optimization on routed designs with incremental placement and routing characterization", IEEE Transactions on Computer-Aided Design of Integrated Circuits and Systems, vol. 19, No. 2, Feb. 2000, pp. 188-196.*

Swinnen et al., "Timing issues related to the automated placement and routing of high performance ASICs", Fourth Annual IEE International ASIC Conference and Exhibit, Sep. 23, 1991, pp. P14-6/1-4.*

(Continued)

*Primary Examiner*—Matthew Smith
*Assistant Examiner*—Phallaka Kik
(74) *Attorney, Agent, or Firm*—Blakely, Sokoloff, Taylor & Zafman LLP

(57) ABSTRACT

Methods and apparatuses to estimate delay for logic circuit optimization using back annotated placement and delay data. In one aspect of the invention, a method to design a logic circuit, the method includes: modifying a first path that is back annotated with first placement information and first delay information to generate a second path; and calculating a signal delay on the second path from second placement information for the second path, the first placement information and the first delay information (or, computing an adjustment to the first delay information from second placement information for the second path and the first placement information). In one example according to this aspect, the first placement information and the first delay information are back annotated from a timing analysis based on placing and routing at least the first path. An actual route is determined from the first placement information in calculating the signal delay.

72 Claims, 14 Drawing Sheets

OTHER PUBLICATIONS

Park et al., "Backward-annotation of post-layout delay information into high-level synthesis process for performance optimization", 6th International Conference on VLSI and CAD, Oct. 26, 1999, pp. 25-28.*

Naseer et al., "Optimal clock period for synthesized data paths", 1997 Proceedings of Tenth International Conference on VLSI Design, Jan. 4, 1997, pp. 134-139.*

Sato et al., "Post-layout optimization for deep submicron design", 33rd Design Automation Conference Proceedings, Jun. 7, 1996, pp. 740-745.*

Saxena et al., "A postprocessing algorithm for crosstalk-driven wire perturbation", IEEE Transactions on Computer-Aided Desig of Integrated Circuits and Systems, vol. 19, No. 6, Jun. 2000, pp. 691-702.*

P. Eles, K. Kuchcinski, Z. Peng, A. Doboli, "Post-synthesis back-annotation of timing information in behavioral VHDL", Journal of Systems Architecture, Elsevier, 42, 1996/1997, pp.725-741.

Notes Taken from: "Its's The methodology, Stupid!", by Pran Kurup, Taher Abbasi, Ricky Bedi, Publisher: ByteK Designs, Inc.; (1 edition Dec. 1, 1998), Jun., 2000.

* cited by examiner

METHOD AND APPARATUS TO ESTIMATE DELAY FOR LOGIC CIRCUIT OPTIMIZATION

This application claims the benefit of the filing date of provisional application Ser. No. 60/388,010, filed Jun. 11, 2002, and entitled "Method and Apparatus to Estimate Delay for Logic Circuit Optimization" by the inventors Dhananjay S. Brahme, Jovanka Ciric, and Kenneth S. McElvain.

FIELD OF THE INVENTION

The invention relates to designing integrated circuits, and more particularly to delay estimation for logic circuit optimization.

BACKGROUND OF THE INVENTION

For the design of digital circuits on the scale of VLSI (very large scale integration) technology, designers often employ computer aided techniques. Standard languages such as Hardware Description Languages (HDLs) have been developed to describe digital circuits to aide in the design and simulation of complex digital circuits. Several hardware description languages, such as VHDL and Verilog, have evolved as industry standards. VHDL and Verilog are general purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an, RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist which can be used to create circuits in the vendor's technology/architecture. It is well known that FPGA vendors utilize different technology/architecture to implement logic circuits within their integrated circuits. Thus, the technology independent RTL netlist is mapped to create a netlist which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning." A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and the routing typically runs faster because as it has been reduced from one very large problem into a series of simpler problems.

After placement of components on the chip and routing of wires between components, timing analysis (e.g., timing simulation, or static timing analysis) can be performed to accurately determine the signal delays between logic elements. Back annotation is typically performed to updates a more-abstract design with information from later design stages. For example, back annotation reads wire delay information and placement information from the placement and route database to annotate the logic synthesis design. Back annotated delay information can be used to identify critical paths where the timing requirements are not satisfied; and logic synthesis may be improved to meet the timing requirements.

FIG. 2 shows a flow chart of a typical method to design an integrated circuit. Operation 201 performs logic synthesis to create a logic element network that performs a given set of functions. The logic synthesis operation may transform and restructure the logic to optimize delays, areas and other design goals. The gate-level logic elements are mapped to vendor specific primitives which are placed into various blocks on the chip. Operation 203 places the vendor specific primitives on the chip and routes the wires between the primitives. In place optimizations are typically performed in operation 205 to optimize timing. In place optimizations make constrained changes to the logic elements without significantly changing the placement of the logic elements. Also, in place optimizations can create place and route or design rule violations, which have to be fixed by place and route programs. Essentially, in place optimizations tweak transistor sizes without moving the logic elements around. After operation 207 performs a timing analysis, the earlier stage design from the logic synthesis of operation 201 is back annotated in operation 209. If operation 211 determines that the timing requirements are not satisfied, the design of the logic synthesis may be changed to meet the timing requirements. Alternatively, further in place optimization may be performed to meet the timing requirements.

A typical software program for logic synthesis uses a delay estimator function based on the fanout of a net. Since all logic elements corresponding to a net with a certain fanout are assumed to have the same wire delay, the estimated delay information is not very accurate. Thus, only limited optimizations like resizing or buffering (known as in place optimizations) are typically performed. However, in place optimizations can provide only limited improvements.

In reality the wire delay depends on the length of the wire and route taken from one logic element to the next logic element. There is a higher correlation between placement distance and wire delay than between fanout and wire delay.

SUMMARY OF THE DESCRIPTION

Methods and apparatuses to estimate delay for logic circuit optimization using back annotated placement and delay data are described here.

In one aspect of the invention, a method to design a logic circuit includes: modifying a first path that is back annotated with first placement information and first delay information to generate a second path; and calculating a signal delay on the second path from second placement information for the second path, the first placement information and the first delay information (or, computing an adjustment to the first delay information from second placement information for the second path and the first placement information). In one example according to this aspect, the first placement information and the first delay information are back annotated from a timing analysis based on placing and routing at least the first path (e.g., a region of an integrated circuit or the entire chip). In one example, an actual route is determined (e.g., from the first placement information, from an routing operation, or from precharacterized exact route delays) in calculating the signal delay. In one example, the signal delay is determined from the first delay information and the adjustment to the first delay information, which is based on first placement information and the second placement information. After a first estimated delay on the first path and a second estimated delay on the second path are obtained, the adjustment to the first delay information is determined from the first and second estimated delays (e.g., from a difference between the first and second estimated delays). In one example, both the first and second estimated delays are estimated from statistics of back annotated delay information for back annotated placements.

In one example according to this aspect, a placement of a logic element on the first path is changed to generate the second path; and/or, a portion of the logic circuit that contains the first path is restructured to generate the second path. In one example, at least one logic element on the first path, which is shared by a third path, is replicated and connected to form the second path and a fourth path so that the second and fourth paths do not share the at least one logic element. In another example, a sequence of logic elements in the first path is changed to generate the second path. In a further example, the portion of the logic circuit is decomposed and mapped to generate first logic, which is incrementally placed into available spaces, where available means unoccupied or occupied by a sufficiently non-critical (in the timing sense) instance. In one example, a logic element connected to a first logic element on the first path is rewired to connect to a second logic element to form the second path, where the outputs of the first and second logic elements between which we are rewiring are logically equivalent.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Many of the methods of the present invention may be performed with a digital processing system, such as a conventional, general purpose computer system. Special purpose computers which are designed or programmed to perform only one function may also be used.

Figure 1:
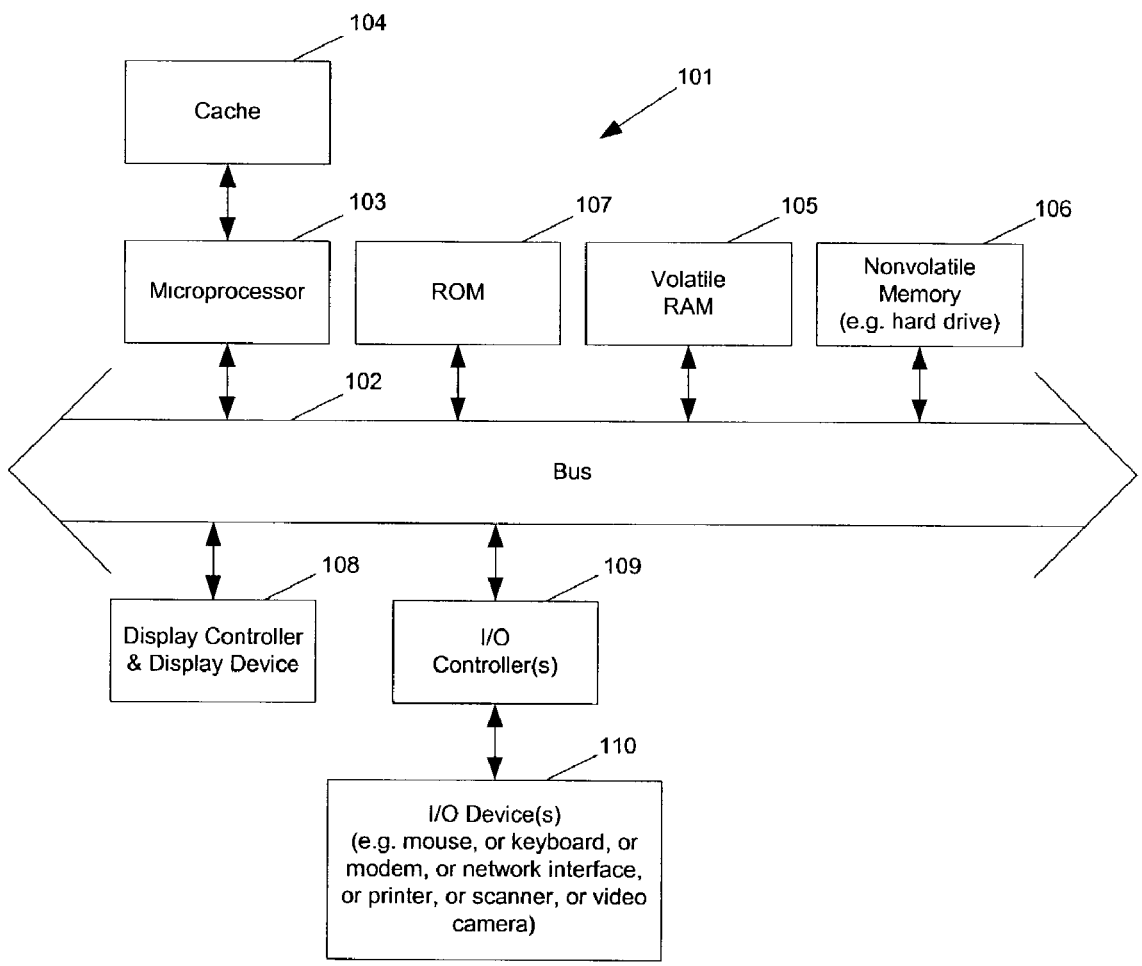
FIG. 1 shows a block diagram example of a data processing system which may be used with the present invention.
Figure 2:
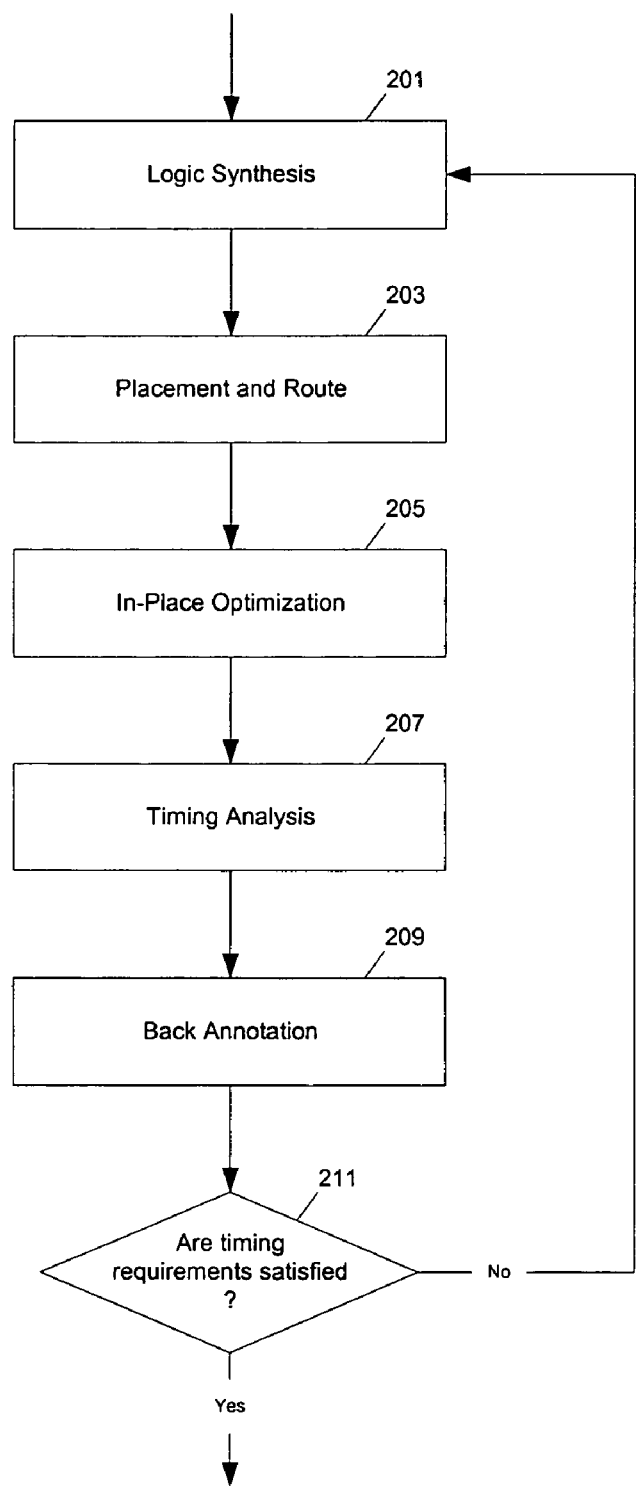
FIG. 2 shows a flow chart of a typical method to design an integrated circuit.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Synthesis and optimizations of logic circuits for reducing the delay of critical paths is an important step in designing and implementing a logic circuit. It is important to have accurate wire delay information to obtain optimization results of good qualities. After the result of logic synthesis is back annotated, subsequent placement and synthesis transformations require new estimated values for wire delays in order to select transformations that improve timing parameters, such as slack. Slack is the difference between the desired delay and the actual (estimated or computed) delay. When the desired delay is larger than the actual delay, the slack is positive; otherwise, the slack is negative. Typically, it is necessary to make the slack positive (or close to zero) to meet the timing requirement (e.g., reducing the wire delay to increase the slack).

At least one embodiment of the present invention seeks to estimate wire delays (e.g., for FPGA and ASIC) based on back annotated placement information, back annotated delay information, and the placement and synthesis transformations that are performed. General optimizations are performed using the delay estimates. Based on accurate wire delay estimations obtained using methods of various embodiment of the present invention, optimizations can be performed to improve logic synthesis accuracy. Examples of optimizations of some embodiments of the present invention involve: (i) moving logic elements (e.g., storage elements, such as a flip-flop, register, memory, or latch, or other logic element, such as a lookup table (LUT)) from one block to another; (ii) replicating logic elements; (iii) rewiring of nets; (iv) restructuring of logic element; and (v) changing a sequence of logic elements for retiming the paths across a critical logic element (e.g., a flip-flop). Detailed examples of optimizations are described below.

In a method according to one embodiment of the present invention, a wire delay is computed based on the placement information of elements and back annotated delays. Based on the computed wire delay, placement and synthesis optimizations are performed to improve timing. Placement and synthesis transformations are performed, such as: (i) moving flip-flops and logic elements on the critical path; (ii) replicating and moving flip-flops or logic elements; (iii) rewiring nets to replicated logic elements to reduce the delay on the logic elements that follow the replicated logic elements in the path; (iv) restructuring groups of logic elements to reduce the delay on the critical path; (v) retiming across flip-flops; and others.

After placement, routing and wire delay extraction are performed, the delay for a wire between unchanged endpoints is estimated using the back annotated wire delay. Delays for wires that connect between unmoved logic elements and newly created logic elements (or moved logic elements) are estimated by computing a placement based adjustment to the back annotated wire delay.

$$delay_{new}=F(delay_{old}, placement_{new}, placement_{old}).$$

where $delay_{new}$ is the new wire delay after the transformation; $delay_{old}$ is the old wire delay before the transformation (e.g., the back annotated delay); $placement_{new}$ is the new placement; and $placement_{old}$ is the old placement. For example, one specific function is:

$$delay_{new}=delay_{old}+delay(placement_{new})-delay(placement_{old}).$$

where function delay(placement) represents a method to estimate a wire delay based on placement information.

The advantage of the formulations according to the present invention is that any routing congestion or blockage between the source and destination areas is automatically taken into account. Thus, the results are much better than those based on wire load or pure placement. Additional adjustments for more or less fanouts or other changes can also be included. Short distance wires are estimated by computing an actual route for which an exact delay can be calculated or is known. These wiring estimation methods can be used with various optimization methods according to various embodiments of the present invention.

When local routing information between near neighbors is available, actual routing is performed to obtain the exact wire delay in one embodiment of the present invention.

When methods of various embodiments of present invention are used to improve the estimation of wire delays, optimizations for the designs of integrated circuits (e.g., ASIC or FPGA) based on such improved estimation of wire delays are more effective. Less iteration will be required to meet the timing requirements.

Figure 3:
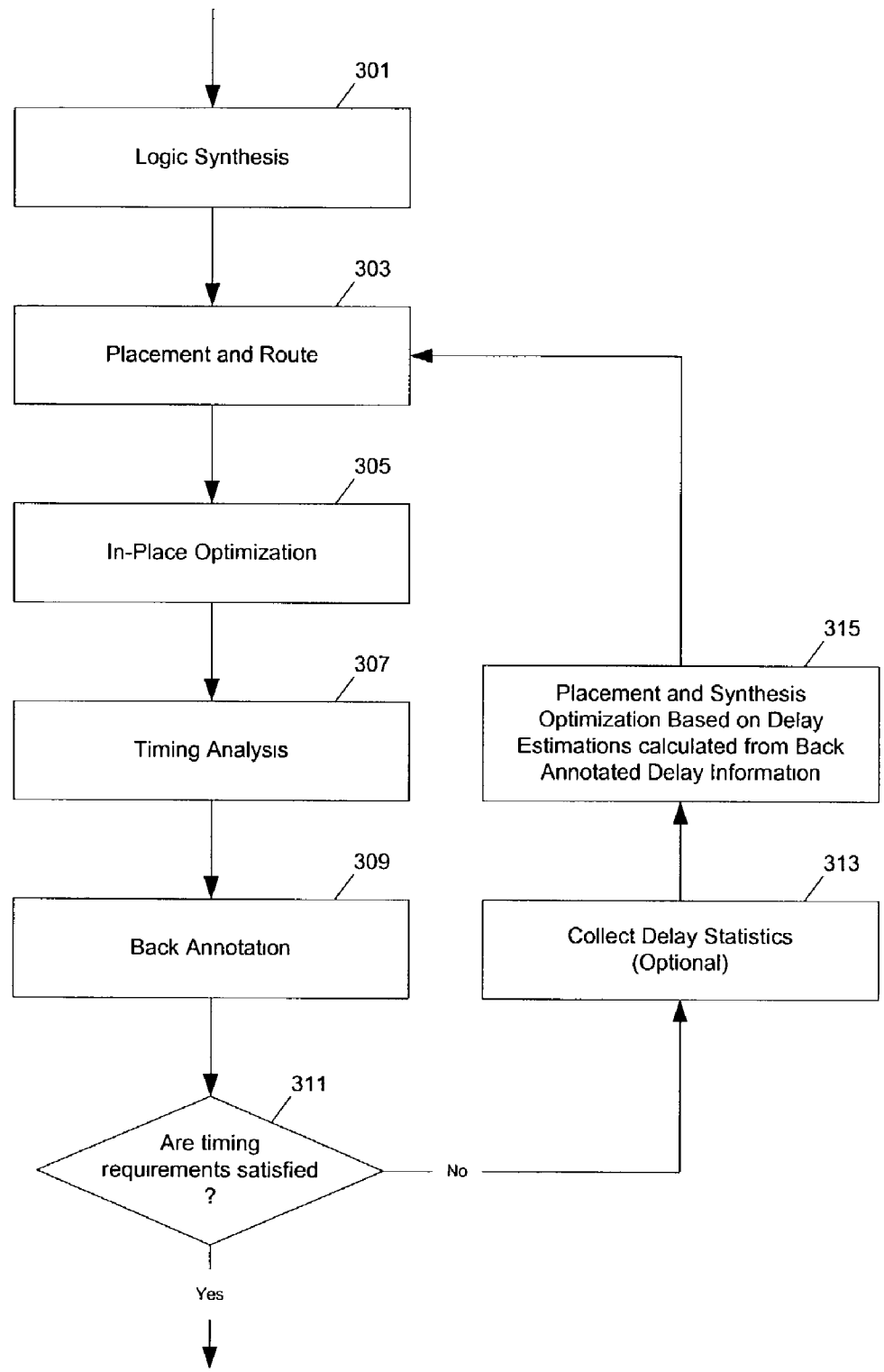
FIG. 3 shows a flow chart of a method to design an integrated circuit according to one embodiment of the present invention.

FIG. 3 shows a flow chart of a method to design an integrated circuit according to one embodiment of the present invention. After operation 301 performs logic synthesis, operation 303 places the components on the chip and routes the wires between the components. Operation 305 performs in place optimizations (e.g., resizing or buffering). After operation 307 performs a timing analysis, operation 309 back annotates placement and delay information. If operation 311 determines that the timing requirements are not satisfied, operation 313 may be performed to collect delay statistics. For example, from the back annotated place information, the wire delays between different blocks (or distances measured in blocks) can be collected, which can be used in estimating wire delays in subsequent optimization with timing constraints. Operation 315 performs placement and synthesis optimizations based on the delay estimations calculated from back annotated delay information and back annotated placement information for possible placement and synthesis transformations. The result of synthesis optimization of operation 315 is used by operation 303 for placement and route.

The placement and synthesis optimization in operation 315 may be performed primary for meeting the timing requirements; it can also be performed for optimizing other design goals (e.g., area, power, cost) with the timing constraints.

Figure 4:
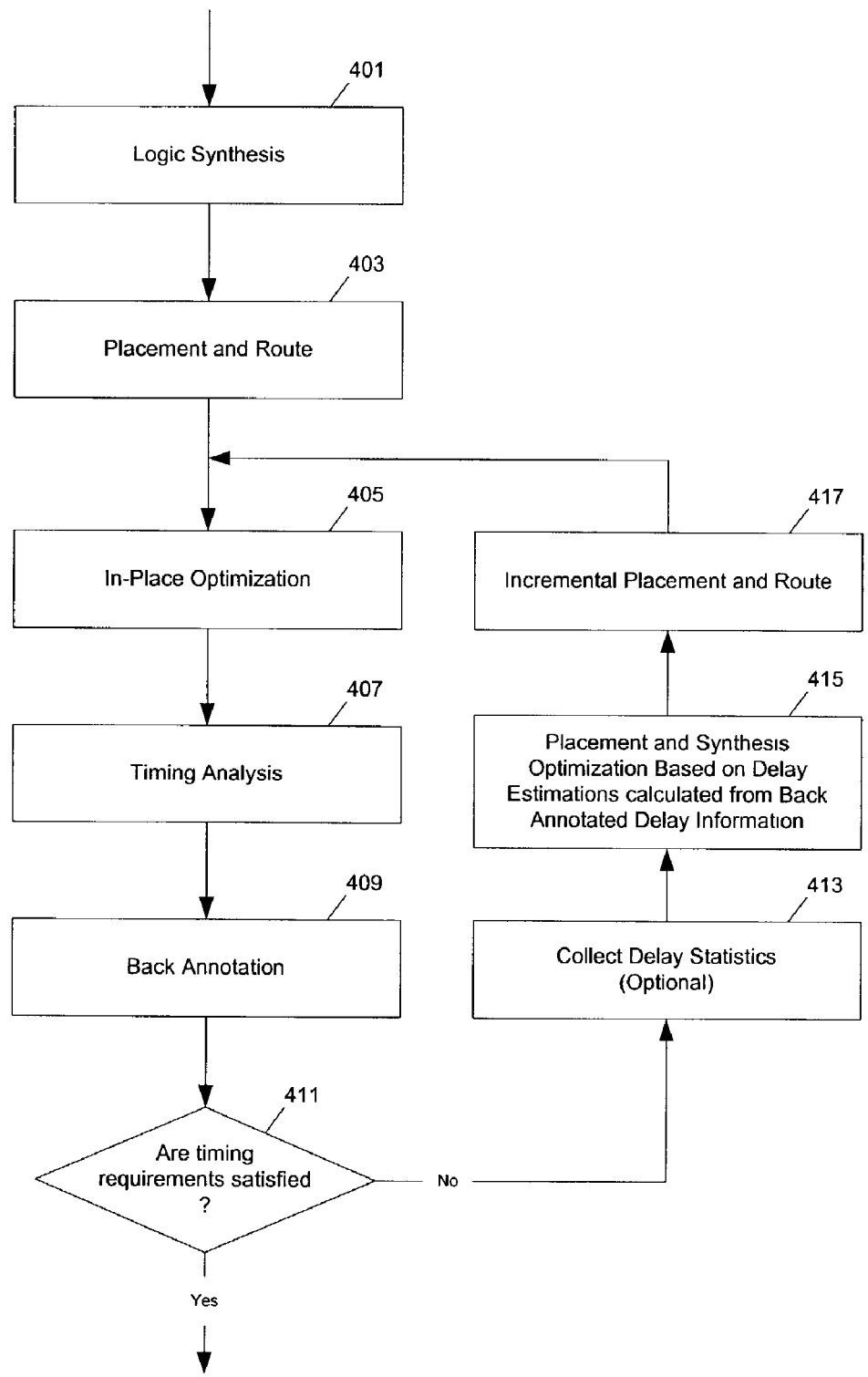
FIG. 4 shows a flow chart of another method to design an integrated circuit according to one embodiment of the present invention.

Since the placement and synthesis optimization in operation 315 typically changes only a small portion of the integrated circuit, it may be desirable to avoid placement and route for the entire integrated circuit when only a small portion of the integrated circuit is changed. FIG. 4 shows a flow chart of another method to design an integrated circuit according to one embodiment of the present invention. Operations 401–415 of FIG. 4 performs similar tasks as operations 301–315 of FIG. 3. The result of the placement and synthesis optimization of operation 415 is used by operation 417 for incremental placement and route so that only the portions that are affected by the optimization are placed and routed to reflect the changes.

Figure 5:
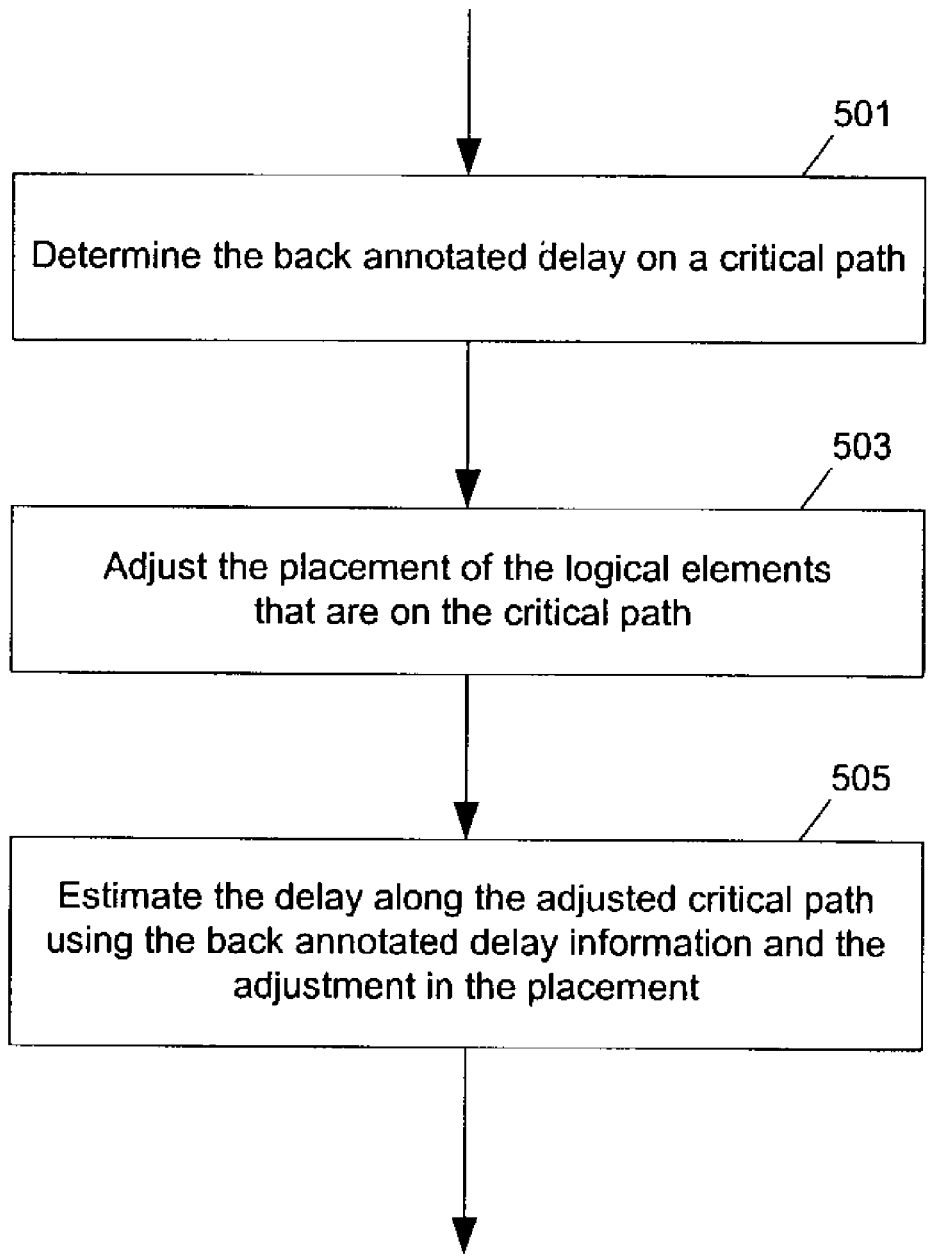
FIG. 5 shows a flow chart of a method to adjust a critical path according to one embodiment of the present invention.

FIG. 5 shows a flow chart of a method to adjust a critical path according to one embodiment of the present invention. Operation 501 determines the back annotated delay on a critical path; operation 503 adjusts the placement of the logic elements that are on the critical path; and operation 505 estimates the delay along the adjusted critical path using the back annotated delay information and the information about the adjustment in the placement.

Figure 6:
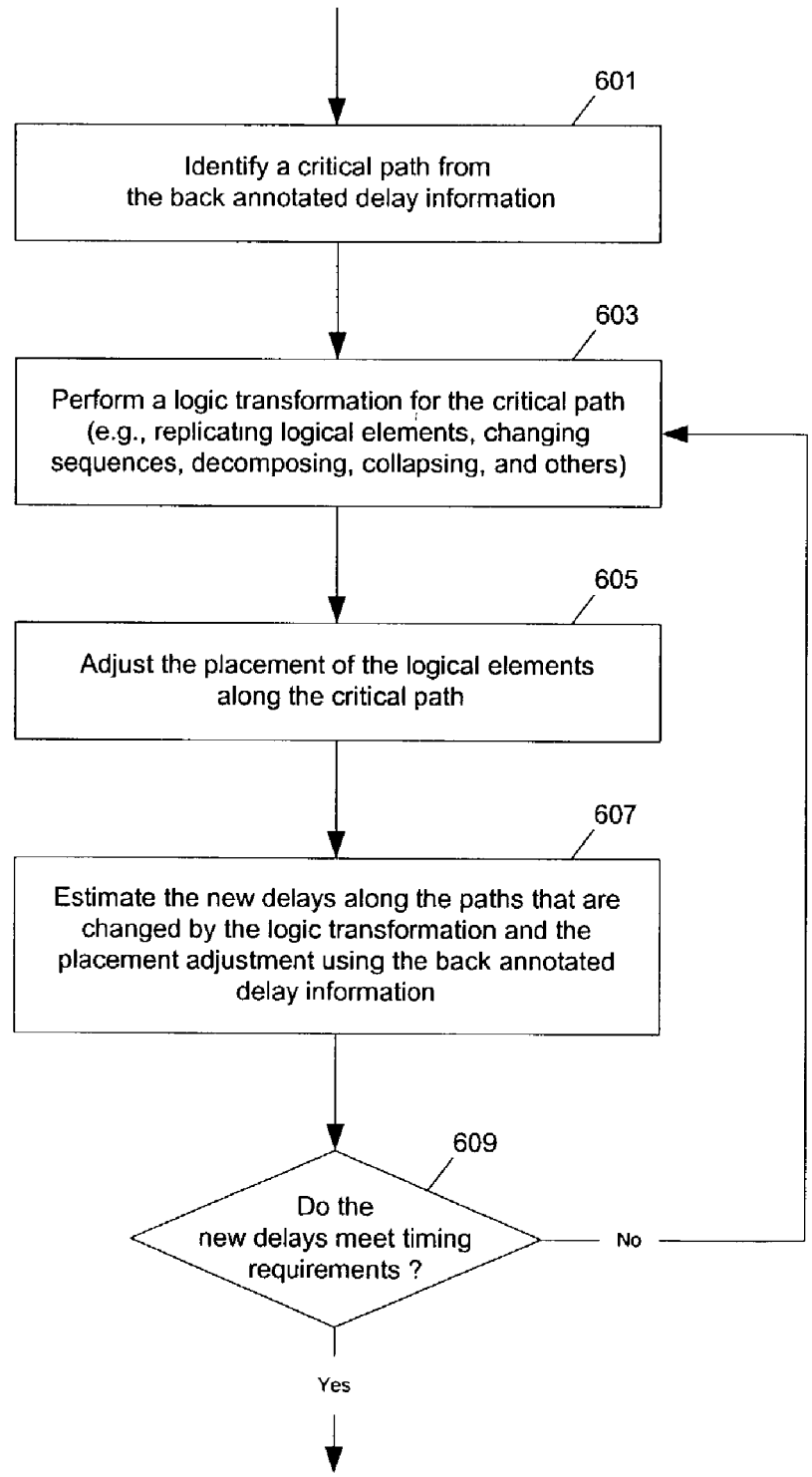
FIG. 6 shows a flow chart of a method to optimize a logic circuit for timing requirements according to one embodiment of the present invention.

FIG. 6 shows a flow chart of a method to optimize a logic circuit for timing requirements according to one embodiment of the present invention. After operation 601 identifies a critical path from the back annotated delay information, operation 603 performs a logic transformation for the critical path (e.g., replicating logic elements, changing sequences, decomposing a logic element, collapsing a net, and others). Operation 605 adjusts the placement of the logic elements along the critical path; and operation 607 estimates the new delays along the paths that are changed by the logic transformation and the placement adjustment using the back annotated delay information. If operation 609 determines that the new delays do not meet the timing requirements, operation 603 performs a further logic transformation. Alternatively, a number of different synthesis and placement transformations may be performed and evaluated with the estimated delays based on the back annotated delay information (or based on the adjustments to the back annotated delay) to select a best result.

Figure 7:
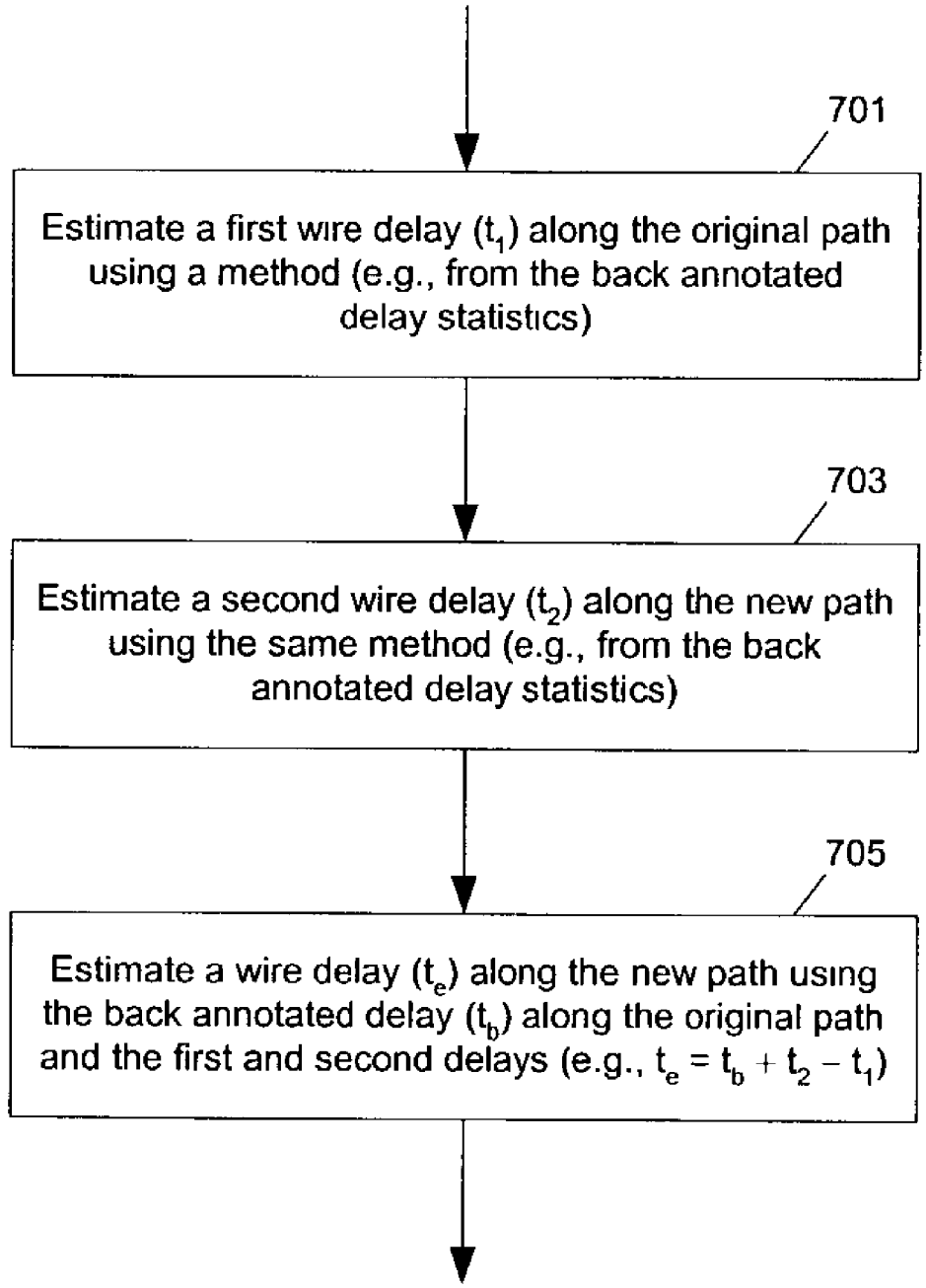
FIG. 7 shows a flow chart of a method to estimate a wire delay from the new placement information, the back annotated delay information, and the back annotated placement information according to one embodiment of the present invention.

FIG. 7 shows a flow chart of a method to estimate a wire delay from the new placement information, the back annotated delay information, and the back annotated placement information according to one embodiment of the present invention. The method of FIG. 7 can be used in operation 607 of FIG. 6 or in operation 505 of FIG. 5. Operation 701 estimates a first wire delay ($t_1$) along the original path using a method (e.g., from the back annotated delay statistics); operation 703 estimates a second wire delay ($t_2$) along the new path using the same method (e.g., from the back annotated delay statistics); and operation 705 estimates a wire delay ($t_e$) along the new path using the back annotated delay ($t_b$) along the original path and the first and second delays (e.g., $t_e=t_b+t_2-t_1$). In one embodiment of the present invention, an adjustment to the back annotated delay ($t_b$) is evaluated (e.g., $t_2-t_1$); and the adjustment to the back annotated delay is used to select a best result from several alternative logic transformations or placement adjustments. In another embodiment of the present invention, a weighted sum of wire delays estimated from different methods is used to estimate the wire delay.

Figure 8:
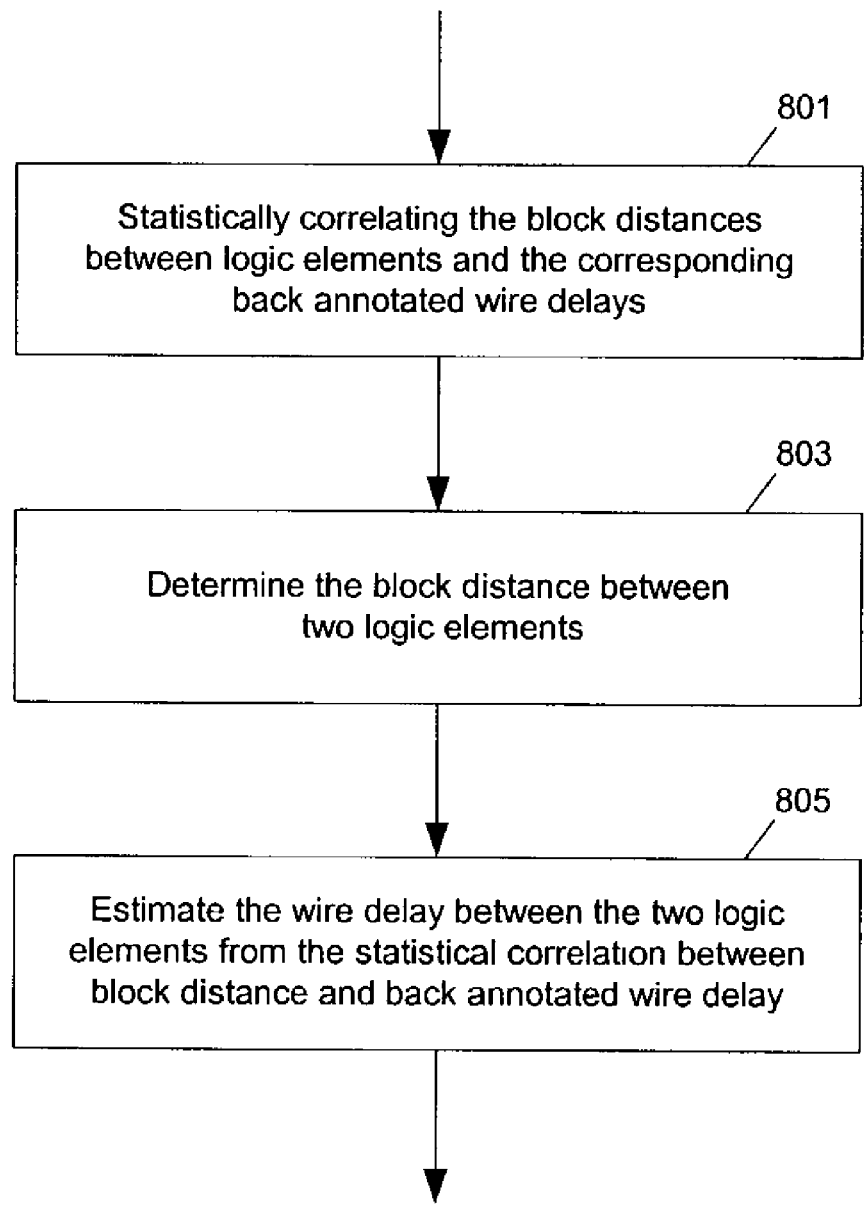
FIG. 8 shows a flow chart of a method to estimate a delay from statistics of back annotated delays and placements according to one embodiment of the present invention.

FIG. 8 shows a flow chart of a method to estimate a delay from statistics of back annotated delays and placements according to one embodiment of the present invention. Portions of the method of FIG. 8 can be used in operations 701 and 703 in FIG. 7. Operation 801 statistically correlates the block distances between logic elements and the corresponding back annotated wire delays. Operation 803 determines the block distance between two logic elements; and operation 805 estimates the wire delay between the two logic elements from the statistical correlation between block distance and back annotated wire delay. During a synthesis and placement optimization process, the logic elements are placed into blocks. To estimate the wire delay between logic elements placed into different blocks, statistics of distances in blocks and corresponding back annotated wire delays can be used to generate empirical formulae (or look up tables). The statistics can be collected for the entire integrated circuit for one back annotated design, or for several iterations of back annotated designs, or for a type of circuit design; etc. For example, back annotated delays between logic elements from different blocks with given horizontal and vertical distances measured in blocks are averaged to provide an estimated wire delay between logic elements placed in blocks with the given horizontal and vertical distances. Alternatively, a measurement of the distance between the blocks can be used to correlate block distance and wire delay. The empirical formulae (or look up tables) can also use fanout as an input parameter, in addition to the block distances.

The foregoing description of the methods in FIGS. 3–8 assumes a particular process flow in which certain operations or actions follow other operations or actions. It will be appreciated that alternative flows may also be practiced with the present invention. Other alternative sequences of operations may be envisioned by those skilled in the art.

The placement and synthesis optimization may involve flip-flop move and replication. For example, after finding a timing critical flip-flop, it is moved closer (in a timing sense estimated using back annotated information) to its critical load logic element, the logic element on the critical path that receives the signal from the flip-flop. If there are multiple critical clusters of load logic elements that receive the signal from the flip-flop on multiple critical paths, it is evaluated whether or not to make a replica of the flip-flop and move the flip-flop near a critical cluster. If the critical path is on the inputs of the flip-flop, the flip-flop may be moved closer (in a timing sense estimated using back annotated information) to the inputs to improve the slack. In addition, logic feeding the flip-flop may also be moved along with the flip-flip to improve the slack on the in path for the flip-flop. Similarly, a cluster of logic elements driven by the flip-flop can be moved closer to its load in a timing sense to improve the slack on the output path of the flip-flop.

Figure 9:
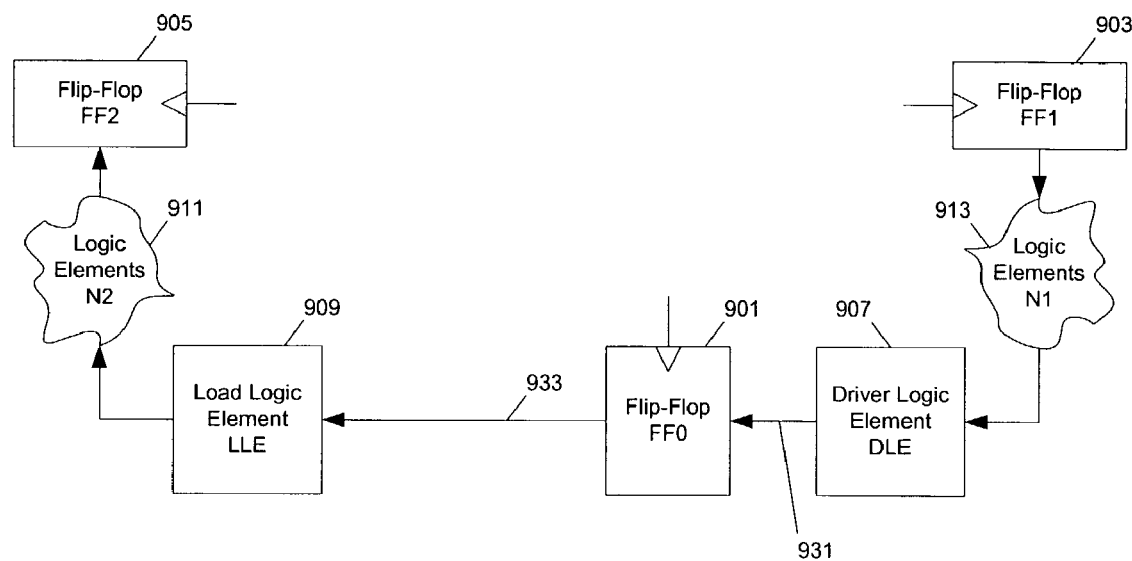
FIGS. 9 and 10 show a method to change a placement of a logic element for meeting timing requirements according to one embodiment of the present invention.
Figure 10:
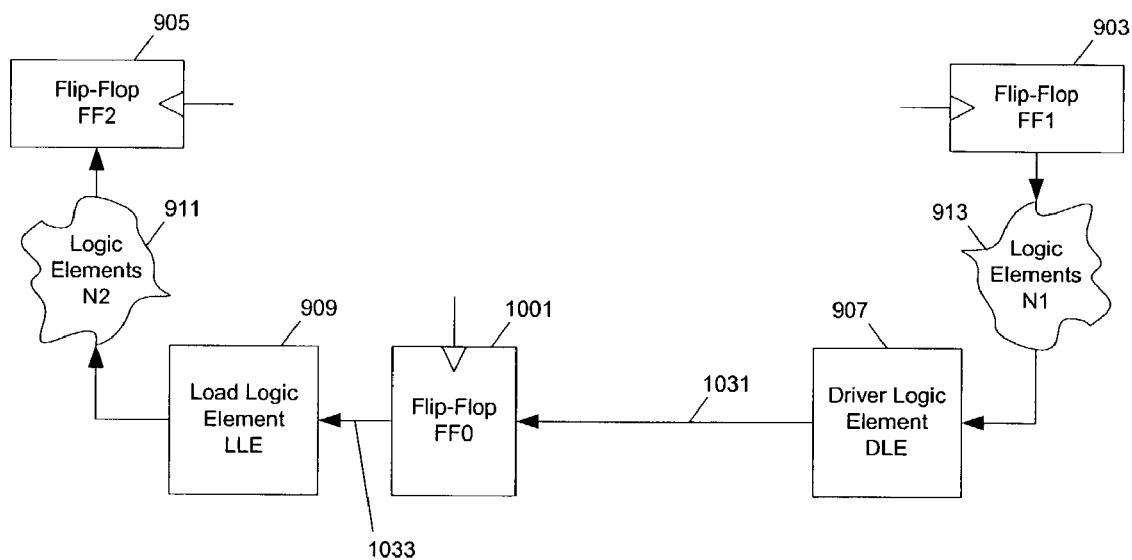

FIGS. 9 and 10 show a method to change a placement of a logic element for meeting timing requirements according to one embodiment of the present invention. Typically, a timing requirement is specified for a path between two storage elements (e.g., flip-flops). FIG. 9 shows a path between flip-flop 901 (FF0) and flip-flop 905 (FF2) and a path between flip-flop 903 (FF1) and flip-flop 901 (FF0). Logic element 909 is called a load logic element of flip-flop 901 since it receives a signal from flip-flop 901; and, logic element 907 is called a driver logic element of flip-flop 901 since it provides a signal to flip-flop 901. Logic elements 911 represent the logic elements on the path from load logic element 909 to flip-flop 905; and logic elements 913 represent the elements on the path from and flip-flop 903 to driver logic element 907. If the slack on the output side of the path for flip-flop 901 (out slack) is worse than the slack on the input side of the path for flip-flop 901 (in slack) and the wire delay on path 933 is too long, flip-flop 901 can be moved toward load logic element 909 to a position as shown by flip-flop 1001 in FIG. 10 to reduce the delay and improve the slack for the path from flip-flop 1001 to flip-flop 905. If the flip-flop is already close to load logic element 909 (e.g., as in FIG. 10) in a timing sense, the flip-flop can be moved with one or more of its load logic elements (e.g., load logic element 909) to reduce the delay on the output side of the flip-flop and to improve the out slack. Similarly, the flip-flop may be moved along or with one or more driving logic elements to reduce the delay on the input side of the flip-flop and to improve the in slack if the in slack is worse than the out slack.

It is seen that accurate estimations of wire delays are necessary for the successful optimization of timing (e.g., reducing the delay for critical paths without failing the timing requirements for other paths).

Figure 11:
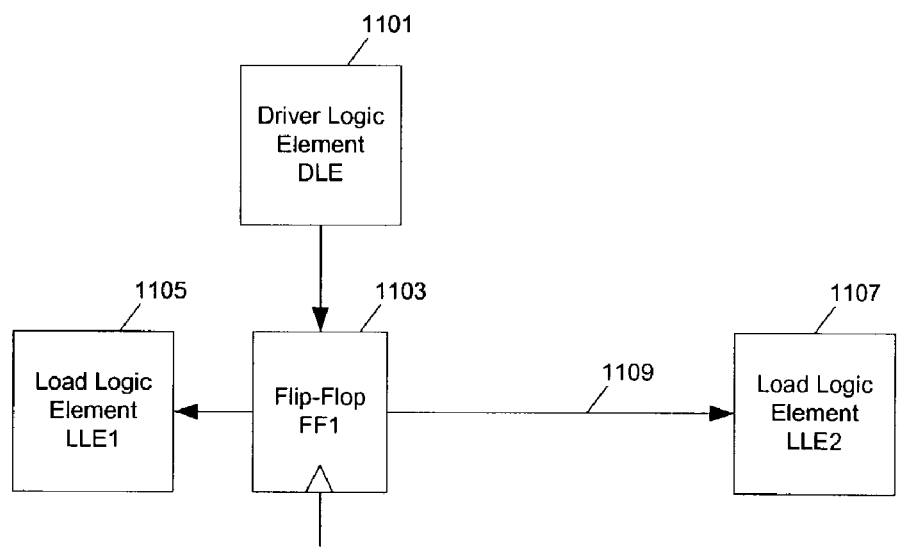
FIGS. 11 and 12 show a method to replicate a logic element for meeting timing requirements according to one embodiment of the present invention.
Figure 12:
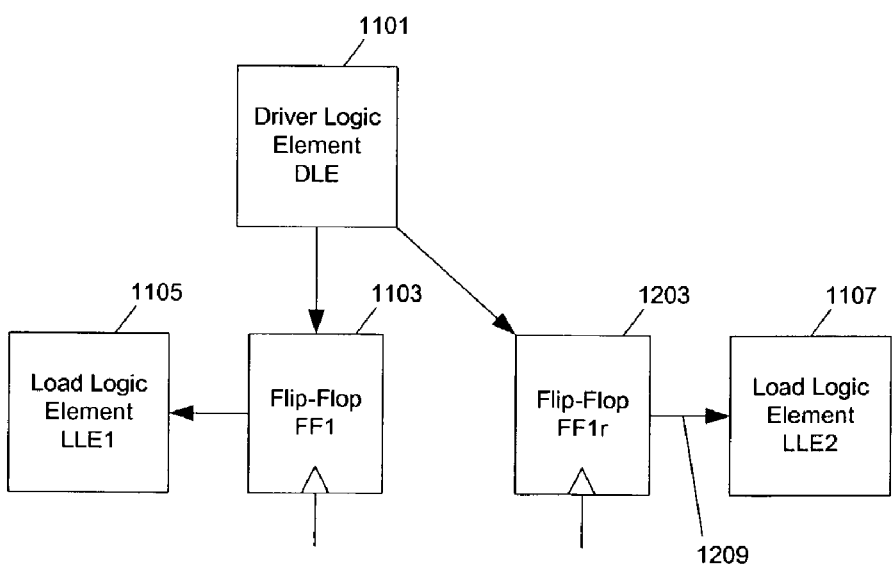

FIGS. 11 and 12 show a method to replicate a logic element for meeting timing requirements according to one embodiment of the present invention. In FIG. 11, flip-flip 1103 is shared by the path from logic element 1103 to load logic element 1105 and the path from logic element 1103 to load element 1107. To reduce the delay on the path from logic element 1103 to load logic element 1107, flip-flop 1103 may be moved toward load logic element 1107. However, moving flip-flop 1103 toward load logic element 1107 may adversely increase the output slack of flip-flop 1103 for load logic element 1107. Thus, flip-flop 1103 is replicated as flip-flop 1203, as shown in FIG. 12. The replicated flip-flop 1203 is placed closer to load logic element 1107 so that the output slack of flip-flop 1103 for load logic element 1105 is not affected and the output slack of flip-flop 1203 for load logic element 1107 is improved.

The placement and synthesis optimization may also involve round trip optimization at a detail placement level. Round trip path segments start in one part of a chip, jump to another part of a chip and then return to the previous part of the chip close to the start of this path segment. Usually a placer makes such a jump because signals generated by elements of the path segment are used in the remote part of the chip. Once round trip path segments are identified, the delay can be improved by replicating the remote part of the path segment (perhaps with some additional elements) and placing the replicated logic elements nearer to the source and destination of the path segment.

Figure 13:
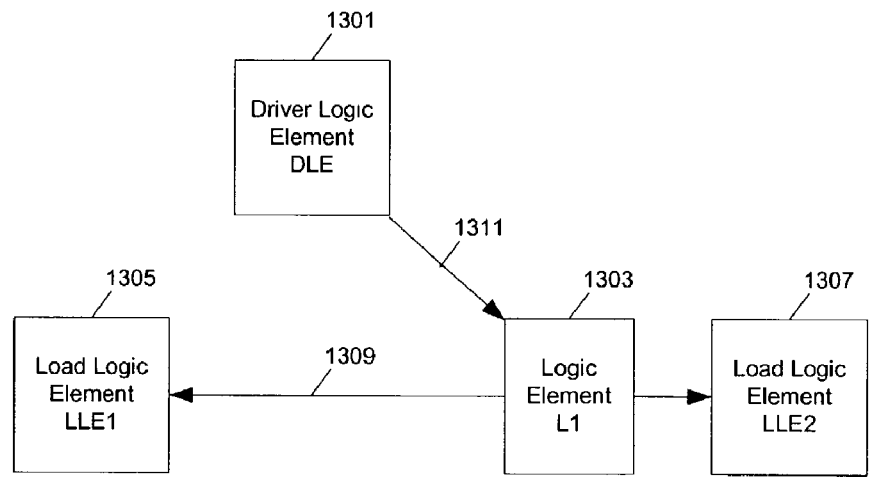
FIGS. 13 and 14 show another method to replicate a logic element for meeting timing requirements according to one embodiment of the present invention.
Figure 14:
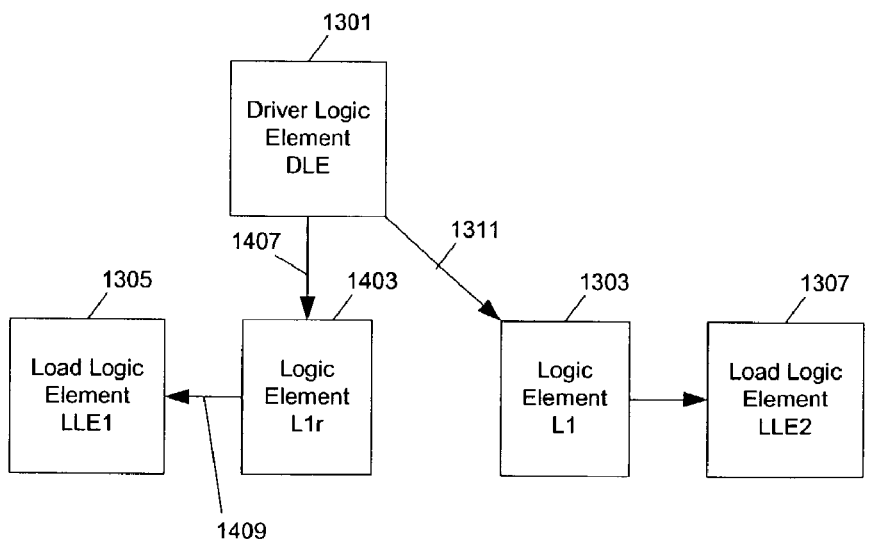

FIGS. 13 and 14 show another method to replicate a logic element for meeting timing requirements according to one embodiment of the present invention. In FIG. 13, logic element 1303 is shared on the path from driver logic element 1301 to load logic element 1307 and the path from driver logic element 1301 to load logic element 1305. The distance between driver logic element 1301 and load logic element 1305 is much smaller than the sum of the distances 1311 and 1309. For example, when logic element 1303 is placed in a region remote to the region where the driver logic element 1301 and load logic element 1305 are placed in, an excessive delay results from the round trip traveling between the regions. To reduce the excessive delay due to the round trip, logic element 1303 can be replicated as logic element 1403 in FIG. 14. The replicated logic element 1403 is placed closer to driver logic element 1301 and load logic element 1305 so that the wire delay on lines 1407 and 1409 is much smaller than the wire delay on line 1311 and 1309. However, if logic element 1303 had one load (e.g., element 1305), logic element 1303 can be relocated (e.g., to the position of element 1403) without having to be replicated. Further, if a logic element (e.g., an already replicated element 1403) that drives the same signal as the logic element (e.g., element 1303) that causes excessive delay for a load element (e.g., element 1305), the load element can be rewired and connected to the logic element (e.g., element 1403) that is close in a timing sense. For example, if logic element 1403 already exists (e.g., replicated in optimizing the timing for another path) and load element 1305 was connected to logic element 1303, load element 1305 can be rewired so that load element 1305 is connected to logic element 1403 instead of logic element 1303.

Although FIGS. 13 and 14 shows that only one logic element is replicated to reduce the round trip delay, more than one logic elements can be replicated if the round trip delay is caused by going through a number of logic elements in a remote region. These remote logic elements may have fanouts, which are not necessary for the path at the local region (e.g., the path from driver logic 1301 to 1305). Thus, the replicated elements can be transformed or rewired to perform the logic necessary only for the path at the local region.

The placement and synthesis optimization may also involve retiming by moving flip-flops over logic and potentially over sequential elements to balance timing slack on the input and output sides of the flip-flops. When moving the flip-flops, the availability of space to contain the flip-flops near the logic is considered.

Figure 15A:
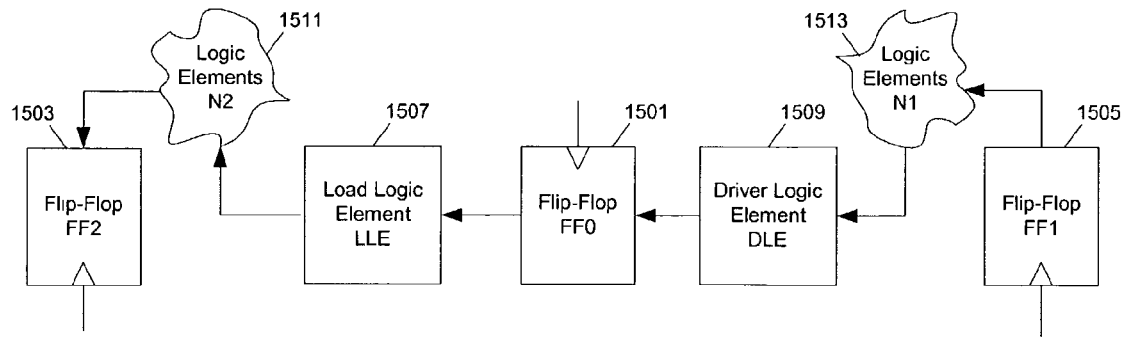
FIGS. 15A, 15B and 16 show a method to change a sequence of logic elements for meeting timing requirements according to one embodiment of the present invention.
Figure 15B:
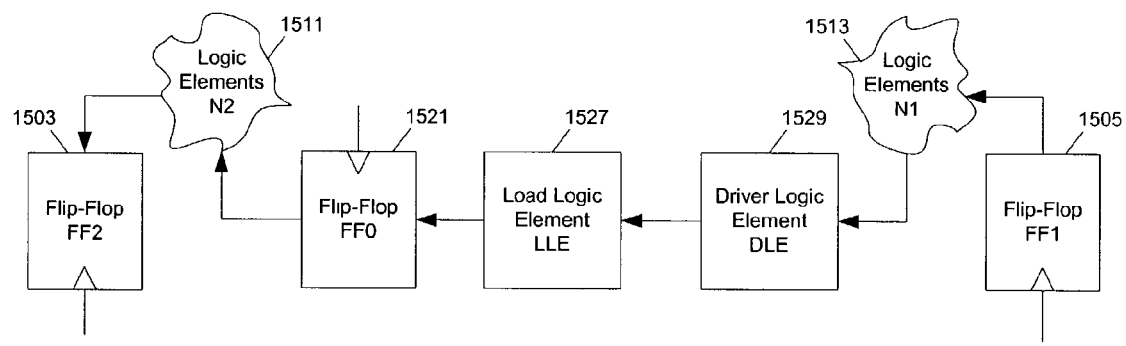
Figure 16:
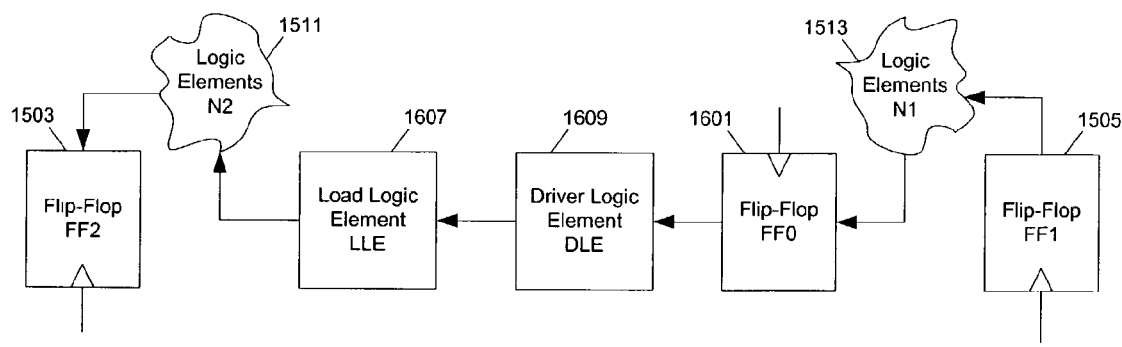

FIGS. 15A, 15B and 16 show a method to change a sequence of logic elements for meeting timing requirements according to one embodiment of the present invention. In FIG. 15A, flip-flop 1501 is between driver logic element 1509 and load logic element 1507. In FIG. 15B, flip-flop

1521 is moved behind load logic element 1527 so that the slack for the path between flip-flops 1521 and 1503 is increased (improved), while the slack for the path between flip-flops 1505 and 1521 is decreased. Similarly in FIG. 16, flip-flop 1601 is moved before driver logic element 1609 so that the slack for the path between flip-flops 1505 and 1601 is improved (increased), while the slack for the path between flip-flops 1601 and 1503 is decreased. Thus, by moving the flip-flops (or other storage elements) over sequential elements, the slack for the input and output sides of the flip-flops may be balanced to meet the timing requirements for the both sides.

The placement and synthesis optimization may also involve logic restructuring. A new timing driven decomposition and mapping of patches of logic along critical paths is performed. The logic is then incrementally placed into available spaces (perhaps made by moving non-critical logic into a separate location) and wiring delays are estimated for alternate placements. The best result is kept.

Figure 17:
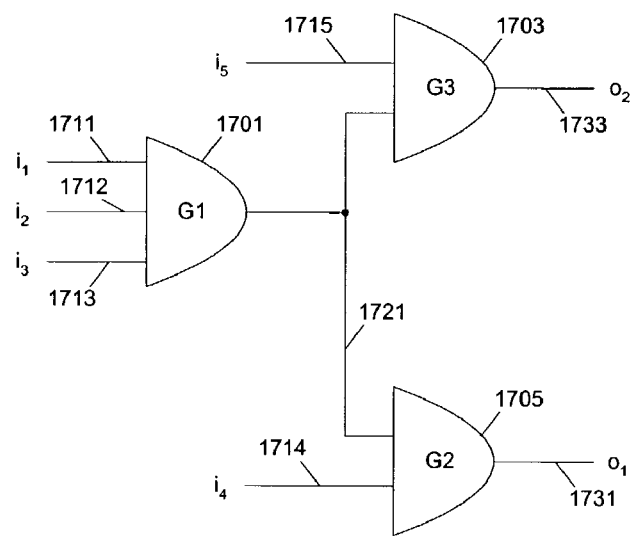
FIGS. 17 and 18 show a method to restructure logic elements to allow signal on a critical line to pass through less logic elements for meeting timing requirements according to one embodiment of the present invention.
Figure 18:
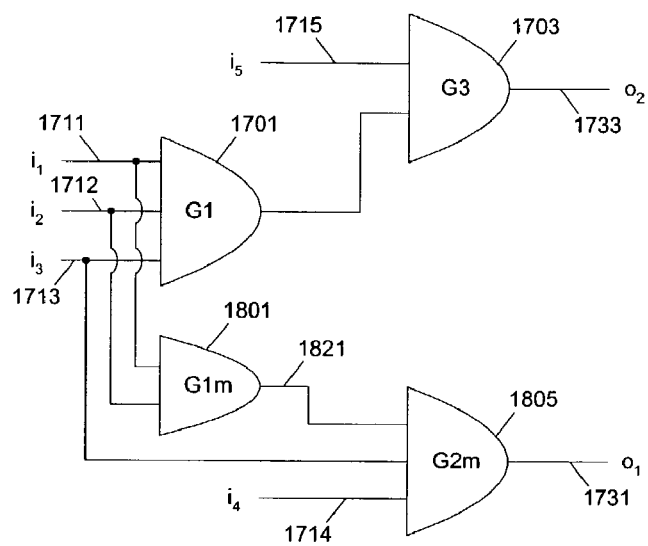

FIGS. 17 and 18 show a method to restructure logic elements to allow signal on a critical line to pass through less logic elements for meeting timing requirements according to one embodiment of the present invention. Consider that the signal $i_3$ on line 1713 has an excessive delay. To improve the timing of the signal on line 1731, signal $i_3$ may be sent to logic unit 1705 directly to avoid the delay in logic element 1701. Thus, the logic in FIG. 17 can be restructured as in FIG. 18. Logic element 1801 combines signal on lines 1711 and 1721 to generate input on line 1821 for logic element 1805; logic element 1701 is disconnected from logic element 1805; and logic element 1705 is replaced by logic element 1805 so that the output on line 1731 is not changed. Signal $i_3$ bypasses logic element 1801 to shorten the overall delay. The output of logic element 1701 drives logic element 1703 so that the output on line 1733 is not changed.

Vendor specific logic primitives have limits on the numbers of inputs allowed for these logic primitives. In some cases, the above described restructuring cannot be performed without exceeding the limit on the number of inputs allowed for the logic primitives. Thus, it may not be possible to push an input to the next logic element without restructuring the inputs for the next logic element in some cases. In such cases, a set of non-critical inputs for the next logic element can be extracted as inputs for an additional logic primitive, which is placed and connected so that the critical input can be pushed to the next logic element with the remaining inputs without exceeding the limit on the number of inputs for the next logic element.

Figure 19:
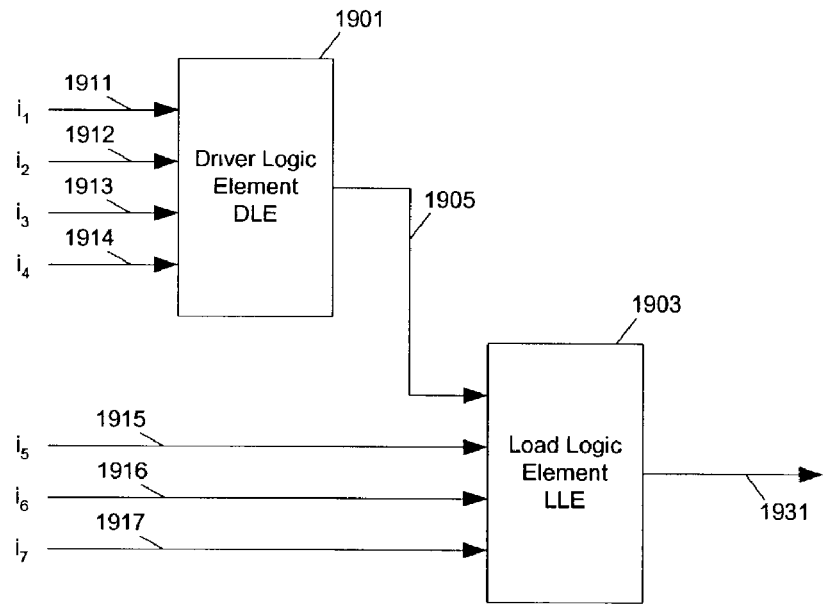
FIGS. 19 and 20 show another method to restructure logic elements for meeting timing requirements according to one embodiment of the present invention.
Figure 20:
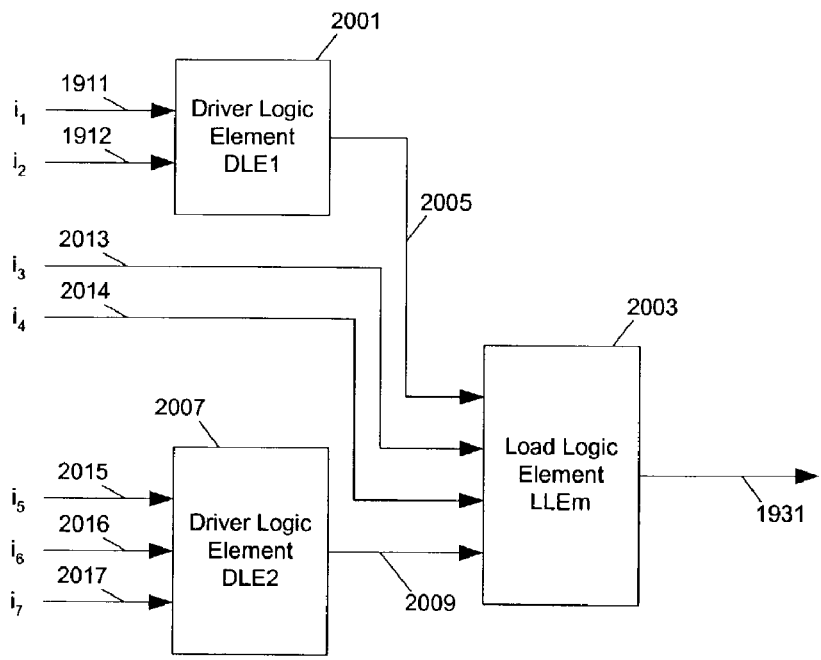

FIGS. 19 and 20 show another method to restructure logic elements for meeting timing requirements according to one embodiment of the present invention. Consider that a logic element can have only four inputs. In FIG. 19, logic element 1903 already has four inputs. To push inputs 1913 and 1914 from drive logic element 1901 to load logic 1903, the inputs for the load logic 1903 must be restructured. The non-critical input signals 1915–1917 are combined by an additional logic element so that inputs 1913 and 1914 can be pushed to load logic element 1903. In FIG. 20, for example, driver logic element 2007 is inserted to combine inputs 2015–2017 as input on line 2009 so that inputs 2013 and 2014 can bypass driver logic element 2001. Driver logic element 2001 and load logic element 2003 replace driver logic element 1901 and load logic element 1903 so that the output on line 1931 remains the unchanged.

It is understood that when searching for space for the results of the optimizations, other logic elements can be relocated to make room if that relocation does not introduce a further timing problem. In FPGAs in particular some routing delays for fixed relative placement can be very small compared to general routing delays. These delays are called "packed" routing delays. "Packed" routing delays or local route delays are known for a part or can be derived by actually performing the routes in sample designs. These precharacterized exact route delays are used for near neighbor wires. Generally, when an element is moved, near critical elements that are connected with a "packed" routing delay are moved with the original object to avoid introducing a large routing delay on a near critical path.

Although the examples for placement and synthesis optimization are described separately, it is understood that methods according to various embodiments of the present invention for optimization can be combined in various different forms. Also, other well-known techniques for synthesis transformation and placement optimization can be combined with the methods for delay estimation and placement and synthesis optimization according to different embodiments of the present invention.

Methods according to various embodiments of the present invention estimate delays by incorporating back annotated delay with placement based delay estimation to give a more accurate delay estimate. The congestion factor is incorporated by including the back annotated delay in the estimate, making the estimate more accurate. The conventional approaches use a table which assigns delays based on fanouts. Hence, the worst slack predicted for those optimizations by the synthesis tool would not correlate closely with the actual results obtained after the placement by place and route tool. This results in poorer quality of optimizations.

One of the principal advantages of the methods according to various embodiments of the present invention is the greater correlation in the estimated wire delays with the delay of the final routed circuit. Thus, there is a greater correlation between the prediction of the worst slack by the synthesis tool and the actual result after placement and route.

In some experiments an average improvement of about 6% on worst critical clock to clock paths on designs implemented on one vendor was achieved using some methods according to various embodiments of the present invention. The average improvement was 8% when all paths (input to clock and clock to output) are included.

While most embodiments of the present invention are intended for use in an HDL design synthesis software program, the invention is not necessarily limited to such use. Although use of other languages and computer programs is possible (e.g. a computer program may be written to describe hardware and thus be considered an expression in an HDL and may be compiled or the invention, in some embodiments, may allocate and reallocate a logic representation, e.g. a netlist, which was created without the use of an HDL), embodiments of the present invention will be described in the context of use in HDL synthesis systems, and particularly those designed for use with integrated circuits which have vendor-specific technology/architectures. As is well known, the target architecture is typically determined by a supplier of programmable ICs. An example of a target architecture is the programmable lookup tables (LUTS) and associated logic of the integrated circuits which are field programmable gate arrays from Xilinx, Inc. of San Jose, Calif. Other examples of target architecture/technology include those well known architectures in field programmable gate arrays and complex programmable logic devices from vendors such as Altera, Lucent Technology, Advanced Micro Devices, and Lattice Semiconductor. For certain embodiments, the present invention may also be employed with application-specific integrated circuits (ASICs).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to design a logic circuit, the method comprising:
   modifying a first path to generate a second path, the first path being back annotated with first placement information and first delay information; and
   calculating a signal delay on the second path from second placement information for the second path, the first placement information and the first delay information.

2. A method as in claim 1 wherein the first placement information and the first delay information are back annotated from a timing analysis based on placing and routing at least the first path.

3. A method as in claim 1 wherein said calculating the signal delay comprises:
   determining an actual route from the first placement information.

4. A method as in claim 1 wherein said calculating the signal delay comprises:
   computing an adjustment to the first delay information; and
   determining the signal delay from the adjustment and the first delay information.

5. A method as in claim 4 wherein said computing the adjustment comprises:
   estimating a first estimated delay on the first path;
   estimating a second estimated delay on the second path; and
   determining the adjustment from the first and second estimated delays.

6. A method as in claim 5 wherein the adjustment is determined from a difference between the first and second estimated delays.

7. A method as in claim 5 wherein both the first and second estimated delays are estimated from statistics of back annotated delay information for back annotated placements.

8. A method as in claim 1 wherein said modifying the first path to generate the second path comprises:
   changing a placement of a logic element on the first path.

9. A method as in claim 1 wherein said modifying the first path to generate the second path comprises:
   restructuring a portion of the logic circuit, the portion containing the first path.

10. A method as in claim 9 wherein said restructuring comprises:
    replicating at least one logic element on the first path as at least one replicated logic element, the at least one logic element being shared on the first path and a third path;
    placing the at least one replicated logic element; and
    connecting the at least one replicated logic element and the at least one logic element to form the second path and a fourth path.

11. A method as in claim 9 wherein said restructuring comprises:
    changing a sequence of logic elements in the first path to generate the second path.

12. A method as in claim 9 wherein said restructuring comprises:
    decomposing and mapping of the portion of the logic circuit to generate first logic; and
    incrementally placing the first logic into available spaces.

13. A method as in claim 9 wherein said restructuring comprises:
    disconnecting a first logic element from a second logic element, the second logic element driving an input signal for the first logic element on the first path; and
    connecting the first logic element to a third logic element, the third logic element driving the input signal for the first logic element on the second path.

14. A method to design a logic circuit, the method comprises:
    modifying a first path to generate a second path, the first path being back annotated with first placement information and first delay information; and
    computing an adjustment to the first delay information from second placement information for the second path and the first placement information.

15. A method as in claim 14 wherein the first placement information and the first delay information are back annotated from a timing analysis based on placing and routing at least the first path.

16. A method as in claim 14 wherein said computing the adjustment comprises:
    estimating a first estimated delay on the first path;
    estimating a second estimated delay on the second path; and
    determining the adjustment from the first and second estimated delays.

17. A method as in claim 16 wherein the adjustment is determined from a difference between the first and second estimated delays.

18. A method as in claim 16 wherein both the first and second estimated delays are estimated from statistics of back annotated delay information for back annotated placements.

19. A method as in claim 14 wherein said modifying the first path to generate the second path comprises:
    changing a placement of a logic element on the first path.

20. A method as in claim 14 wherein said modifying the first path to generate the second path comprises:
    restructuring a portion of the logic circuit, the portion containing the first path.

21. A method as in claim 20 wherein said restructuring comprises:
    replicating at least one logic element on the first path as at least one replicated logic element, the at least one logic element being shared on the first path and a third path;
    placing the at least one replicated logic element; and
    connecting the at least one replicated logic element and the at least one logic element to form the second path and a fourth path.

22. A method as in claim 20 wherein said restructuring comprises:
    changing a sequence of logic elements in the first path to generate the second path.

23. A method as in claim 20 wherein said restructuring comprises:
    decomposing and mapping of the portion of the logic circuit to generate first logic; and
    incrementally placing the first logic into available spaces.

24. A method as in claim 20 wherein said restructuring comprises:
    disconnecting a first logic element from a second logic element, the second logic element driving an input signal for the first logic element on the first path; and connecting the first logic element to a third logic element, the third logic element driving the input signal for the first logic element on the second path.

25. A machine readable medium containing executable computer program instructions which when executed by a digital processing system cause said system to perform a method to design a logic circuit, the method comprising:

modifying a first path to generate a second path, the first path being back annotated with first placement information and first delay information; and calculating a signal delay on the second path from second placement information for the second path, the first placement information and the first delay information.

26. A medium as in claim 25 wherein the first placement information and the first delay information are back annotated from a timing analysis based on placing and routing at least the first path.

27. A medium as in claim 25 wherein said calculating the signal delay comprises:

determining an actual route from the first placement information.

28. A medium as in claim 25 wherein said calculating the signal delay comprises:

computing an adjustment to the first delay information; and determining the signal delay from the adjustment and the first delay information.

29. A medium as in claim 28 wherein said computing the adjustment comprises:

estimating a first estimated delay on the first path;

estimating a second estimated delay on the second path; and determining the adjustment from the first and second estimated delays.

30. A medium as in claim 29 wherein the adjustment is determined from a difference between the first and second estimated delays.

31. A medium as in claim 29 wherein both the first and second estimated delays are estimated from statistics of back annotated delay information for back annotated placements.

32. A medium as in claim 25 wherein said modifying the first path to generate the second path comprises:

changing a placement of a logic element on the first path.

33. A medium as in claim 25 wherein said modifying the first path to generate the second path comprises:

restructuring a portion of the logic circuit, the portion containing the first path.

34. A medium as in claim 33 wherein said restructuring comprises:

replicating at least one logic element on the first path as at least one replicated logic element, the at least one logic element being shared on the first path and a third path;

placing the at least one replicated logic element; and connecting the at least one replicated logic element and the at least one logic element to form the second path and a fourth path.

35. A medium as in claim 33 wherein said restructuring comprises:

changing a sequence of logic elements in the first path to generate the second path.

36. A medium as in claim 33 wherein said restructuring comprises:

decomposing and mapping of the portion of the logic circuit to generate first logic; and incrementally placing the first logic into available spaces.

37. A medium as in claim 33 wherein said restructuring comprises:

disconnecting a first logic element from a second logic element, the second logic element driving an input signal for the first logic element on the first path; and connecting the first logic element to a third logic element, the third logic element driving the input signal for the first logic element on the second path.

38. A machine readable medium containing executable computer program instructions which when executed by a digital processing system cause said system to perform a method to design a logic circuit, the method comprising:

modifying a first path to generate a second path, the first path being back annotated with first placement information and first delay information; and computing an adjustment to the first delay information from second placement information for the second path and the first placement information.

39. A medium as in claim 38 wherein the first placement information and the first delay information are back annotated from a timing analysis based on placing and routing at least the first path.

40. A medium as in claim 38 wherein said computing the adjustment comprises:

estimating a first estimated delay on the first path;

estimating a second estimated delay on the second path; and determining the adjustment from the first and second estimated delays.

41. A medium as in claim 40 wherein the adjustment is determined from a difference between the first and second estimated delays.

42. A medium as in claim 40 wherein both the first and second estimated delays are estimated from statistics of back annotated delay information for back annotated placements.

43. A medium as in claim 38 wherein said modifying the first path to generate the second path comprises:

changing a placement of a logic element on the first path.

44. A medium as in claim 38 wherein said modifying the first path to generate the second path comprises:

restructuring a portion of the logic circuit, the portion containing the first path.

45. A medium as in claim 44 wherein said restructuring comprises:

replicating at least one logic element on the first path as at least one replicated logic element, the at least one logic element being shared on the first path and a third path;

placing the at least one replicated logic element; and connecting the at least one replicated logic element and the at least one logic element to form the second path and a fourth path.

46. A medium as in claim 44 wherein said restructuring comprises:

changing a sequence of logic elements in the first path to generate the second path.

47. A medium as in claim 44 wherein said restructuring comprises:

decomposing and mapping of the portion of the logic circuit to generate first logic; and incrementally placing the first logic into available spaces.

48. A medium as in claim 44 wherein said restructuring comprises:

disconnecting a first logic element from a second logic element, the second logic element driving an input signal for the first logic element on the first path; and connecting the first logic element to a third logic element, the third logic element driving the input signal for the first logic element on the second path.

49. A digital processing system to design a logic circuit, the digital processing system comprising:
- means for modifying a first path to generate a second path, the first path being back annotated with first placement information and first delay information; and
- means for calculating a signal delay on the second path from second placement information for the second path, the first placement information and the first delay information.

50. A digital processing system as in claim 49 wherein the first placement information and the first delay information are back annotated from a timing analysis based on placing and routing at least the first path.

51. A digital processing system as in claim 49 wherein said means for calculating the signal delay comprises:
- means for determining an actual route from the first placement information.

52. A digital processing system as in claim 49 wherein said means for calculating the signal delay comprises:
- means for computing an adjustment to the first delay information; and
- means for determining the signal delay from the adjustment and the first delay information.

53. A digital processing system as in claim 52 wherein said means for computing the adjustment comprises:
- means for estimating a first estimated delay on the first path;
- means for estimating a second estimated delay on the second path; and
- means for determining the adjustment from the first and second estimated delays.

54. A digital processing system as in claim 53 wherein the adjustment is determined from a difference between the first and second estimated delays.

55. A digital processing system as in claim 53 wherein both the first and second estimated delays are estimated from statistics of back annotated delay information for back annotated placements.

56. A digital processing system as in claim 49 wherein said means for modifying the first path to generate the second path comprises:
- means for changing a placement of a logic element on the first path.

57. A digital processing system as in claim 49 wherein said means for modifying the first path to generate the second path comprises:
- means for restructuring a portion of the logic circuit, the portion containing the first path.

58. A digital processing system as in claim 57 wherein said means for restructuring comprises:
- means for replicating at least one logic element on the first path as at least one replicated logic element, the at least one logic element being shared on the first path and a third path;
- means for placing the at least one replicated logic element; and
- means for connecting the at least one replicated logic element and the at least one logic element to form the second path and a fourth path.

59. A digital processing system as in claim 57 wherein said means for restructuring comprises:
- means for changing a sequence of logic elements in the first path to generate the second path.

60. A digital processing system as in claim 57 wherein said means for restructuring comprises:
- means for decomposing and mapping of the portion of the logic circuit to generate first logic; and
- means for incrementally placing the first logic into available spaces.

61. A digital processing system as in claim 57 wherein said means for restructuring comprises:
- means for disconnecting a first logic element from a second logic element, the second logic element driving an input signal for the first logic element on the first path; and
- means for connecting the first logic element to a third logic element, the third logic element driving the input signal for the first logic element on the second path.

62. A digital processing system to design a logic circuit, the digital processing system comprising:
- means for modifying a first path to generate a second path, the first path being back annotated with first placement information and first delay information; and
- means for computing an adjustment to the first delay information from second placement information for the second path and the first placement information.

63. A digital processing system as in claim 62 wherein the first placement information and the first delay information are back annotated from a timing analysis based on placing and routing at least the first path.

64. A digital processing system as in claim 62 wherein said means for computing the adjustment comprises:
- means for estimating a first estimated delay on the first path;
- means for estimating a second estimated delay on the second path; and
- means for determining the adjustment from the first and second estimated delays.

65. A digital processing system as in claim 64 wherein the adjustment is determined from a difference between the first and second estimated delays.

66. A digital processing system as in claim 64 wherein both the first and second estimated delays are estimated from statistics of back annotated delay information for back annotated placements.

67. A digital processing system as in claim 62 wherein said means for modifying the first path to generate the second path comprises:
- means for changing a placement of a logic element on the first path.

68. A digital processing system as in claim 62 wherein said means for modifying the first path to generate the second path comprises:
- means for restructuring a portion of the logic circuit, the portion containing the first path.

69. A digital processing system as in claim 68 wherein said means for restructuring comprises:
- means for replicating at least one logic element on the first path as at least one replicated logic element, the at least one logic element being shared on the first path and a third path;
- means for placing the at least one replicated logic element; and
- means for connecting the at least one replicated logic element and the at least one logic element to form the second path and a fourth path.

70. A digital processing system as in claim 68 wherein said means for restructuring comprises:
- means for changing a sequence of logic elements in the first path to generate the second path.

71. A digital processing system as in claim 68 wherein said means for restructuring comprises:
- means for decomposing and mapping of the portion of the logic circuit to generate first logic; and
- means for incrementally placing the first logic into available spaces.

72. A digital processing system as in claim 68 wherein said means for restructuring comprises:

means for disconnecting a first logic element from a second logic element, the second logic element driving an input signal for the first logic element on the first path; and means for connecting the first logic element to a third logic element, the third logic element driving the input signal for the first logic element on the second path.

* * * * *